United States Patent
Costa et al.

(10) Patent No.: US 12,427,381 B2
(45) Date of Patent: Sep. 30, 2025

(54) GOLF BALLS WITH INCREASED SHEAR DURABILITY

(71) Applicant: Acushnet Company, Fairhaven, MA (US)

(72) Inventors: Edward Costa, East Providence, RI (US); Nelson Araujo, South Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 48 days.

(21) Appl. No.: 17/846,135

(22) Filed: Jun. 22, 2022

(65) Prior Publication Data

US 2023/0415001 A1 Dec. 28, 2023

(51) Int. Cl.
*A63B 37/06* (2006.01)
*A63B 37/00* (2006.01)
*C08L 75/08* (2006.01)

(52) U.S. Cl.
CPC ...... *A63B 37/0024* (2013.01); *A63B 37/0051* (2013.01); *C08L 75/08* (2013.01); *A63B 37/0074* (2013.01); *A63B 37/0075* (2013.01); *C08L 2207/04* (2013.01)

(58) Field of Classification Search
CPC .................................................. A63B 37/0023
See application file for complete search history.

(56) References Cited

U.S. PATENT DOCUMENTS

| | | | |
|---|---|---|---|
| 5,989,136 A * | 11/1999 | Renard | A63B 37/0039 473/376 |
| 6,677,401 B2 | 1/2004 | Boehm et al. | |
| 6,992,135 B2 | 1/2006 | Boehm et al. | |
| 2003/0073514 A1* | 4/2003 | Iwami | C08L 75/04 473/371 |
| 2019/0083856 A1* | 3/2019 | Sullivan | A63B 1/00 |
| 2021/0093929 A1* | 4/2021 | Cooper | A63B 37/0063 |

* cited by examiner

*Primary Examiner* — Raeann Gorden
(74) *Attorney, Agent, or Firm* — Bradley Arant Boult Cummings LLP

(57) ABSTRACT

Compositions for use in golf balls and golf balls including such compositions that have increased shear durability. Such compositions include a blend of at least two thermoplastic elastomers.

14 Claims, 4 Drawing Sheets

GOLF BALLS WITH INCREASED SHEAR DURABILITY

FIELD OF THE INVENTION

The present disclosure relates generally to compositions for use in golf balls to increase shear durability. More particularly, the present disclosure relates to thermoplastic elastomer compositions that, when used in golf balls, provide a finished golf ball with increased shear durability and desirable aerodynamic characteristics.

BACKGROUND OF THE INVENTION

The performance and/or durability of a golf ball is affected by a variety of factors including the materials, weight, size, dimple pattern, and external shape of the golf ball. Golf ball manufacturers are constantly tweaking the materials and construction of a ball in an effort to make incremental gains in performance and/or durability. In this aspect, most multi-piece, solid golf balls today include at least a solid inner core made of natural or synthetic rubber protected by a single or dual cover. Cover layers may be made of a variety of materials including ethylene acid copolymer ionomers, polyamides, polyesters, polyurethanes, and polyureas.

Thermoplastic elastomeric compositions are commonly used in cover layers of a golf ball to achieve certain desired performance characteristics and durability. In fact, thermoplastic elastomers allow manufacturers a variety of design options in that generally such elastomers allow shaping without vulcanization (unlike rubbers) and offer wide ranges of hardness and elasticity. In this regard, golf balls with urethane covers are common in the golf ball industry and have suitable durability and performance, e.g., spin and COR. Such urethane covers are either cast using a thermosetting urethane or injection molded using a thermoplastic urethane.

Since the cross-linking bonds in thermoset polyurethanes, which typically have a high level of cross-linking, are irreversibly set and are not broken when exposed to heat. Thus, thermoset polyurethanes, thermoset polyurethanes are relatively rigid. In contrast, thermoplastic polyurethanes have minimal cross-linking and are relatively flexible. In particular, the cross-linking bonds in thermoplastic polyurethanes can be reversibly broken by increasing temperature such as during molding or extrusion.

Based on the good melt flow properties and different molding methods available, manufacturers generally prefer thermoplastic polyurethanes over thermoset polyurethanes. Players may prefer the feel of a golf ball with a thermoplastic polyurethane cover as compared to one cast from thermoset polyurethane. However, the molding process can be aggressive on the polymer chains of a thermoplastic urethane and produce a cover with lower shear durability, cut-resistance, mechanical strength, and/or impact durability as compared to cast urethane covers. In other words, while thermoplastic polyurethanes have good processability, covers made of thermoplastic polyurethanes may not be as tough and durable as other polymers (including thermoset polyurethanes).

Thus, it would be advantageous to have thermoplastic compositions for use in golf balls that improve the durability of the golf ball while still providing desirable playing properties. The present invention provides such compositions and golf balls including components made with such compositions.

SUMMARY OF THE INVENTION

The present disclosure relates to a golf ball, including: a core; and a cover, wherein the cover is formed from a thermoplastic elastomer composition including a first thermoplastic elastomer present in an amount of about 90 to about 99 weight percent by weight and a second thermoplastic elastomer present in an amount of about 1 to about 10 weight percent based on the total weight of the thermoplastic elastomer composition, and wherein the second thermoplastic elastomer includes polyether block amide.

In one embodiment, the first thermoplastic elastomer includes organic units joined by at least one of the following linkages:

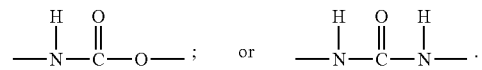

In some embodiments, the second thermoplastic elastomer is present in an amount of about 1 to about 7.5 weight percent based on the total weight of the thermoplastic elastomer composition. For example, the second thermoplastic elastomer may be present in an amount of about 1 to about 5 weight percent based on the total weight of the thermoplastic elastomer composition.

In other embodiments, the first thermoplastic elastomer is thermoplastic polyurethane. In some aspects, the thermoplastic polyurethane may include polyether segments. In still other embodiments, the golf ball may include a layer disposed between the core and the cover. In some aspects, this layer may include an ionomer material.

The present disclosure also relates to a golf ball, including: a core; a layer disposed on the core; and a cover disposed on the layer, wherein the cover is formed from a thermoplastic polyurethane elastomer present in an amount of about 90 to about 99 weight percent by weight and a second thermoplastic elastomer present in an amount of about 1 to about 10 weight percent based on the total weight of the thermoplastic elastomer composition, wherein the thermoplastic polyurethane elastomer includes polyether segments, and wherein the second thermoplastic elastomer includes polyether and polyamide blocks. The layer may include an ionomer material.

In some embodiments, the second thermoplastic elastomer includes polyether block amide. In other embodiments, the second thermoplastic elastomer is present in an amount of about 1 to about 7.5 weight percent based on the total weight of the thermoplastic elastomer composition. In still other embodiments, the second thermoplastic elastomer is present in an amount of about 1 to about 3 weight percent based on the total weight of the thermoplastic elastomer composition.

The present disclosure is also directed to a golf ball, including: a core; and a cover, wherein the cover is formed from a thermoplastic elastomer composition including a first thermoplastic elastomer present in an amount of about 80 to about 99 weight percent by weight and a second thermoplastic elastomer present in an amount of about 1 to about 20 weight percent based on the total weight of the thermoplastic elastomer composition, and wherein the second thermoplastic elastomer includes polyether-ester block copolymer. In some embodiments, the first thermoplastic elastomer includes thermoplastic polyurethane, and wherein the thermoplastic polyurethane includes polyester segments. In other embodiments, the second thermoplastic elastomer is present in an amount of about 1 to about 10 weight percent based on the total weight of the thermoplastic elastomer composition. In still other embodiments, the second thermoplastic elastomer is present in an amount of about 1 to about 5 weight percent based on the total weight of the thermoplastic elastomer composition. The golf ball may further include a layer disposed between the core and the cover. In some aspects, the layer may include an ionomer material. The core may include a center and an outer core layer disposed on the center, wherein the center is formed from a first rubber composition and the outer core layer is formed from a second rubber composition.

BRIEF DESCRIPTION OF THE DRAWINGS

Further features and advantages of the invention can be ascertained from the following detailed description that is provided in connection with the drawings described below.

DETAILED DESCRIPTION OF THE INVENTION

Figure 1:
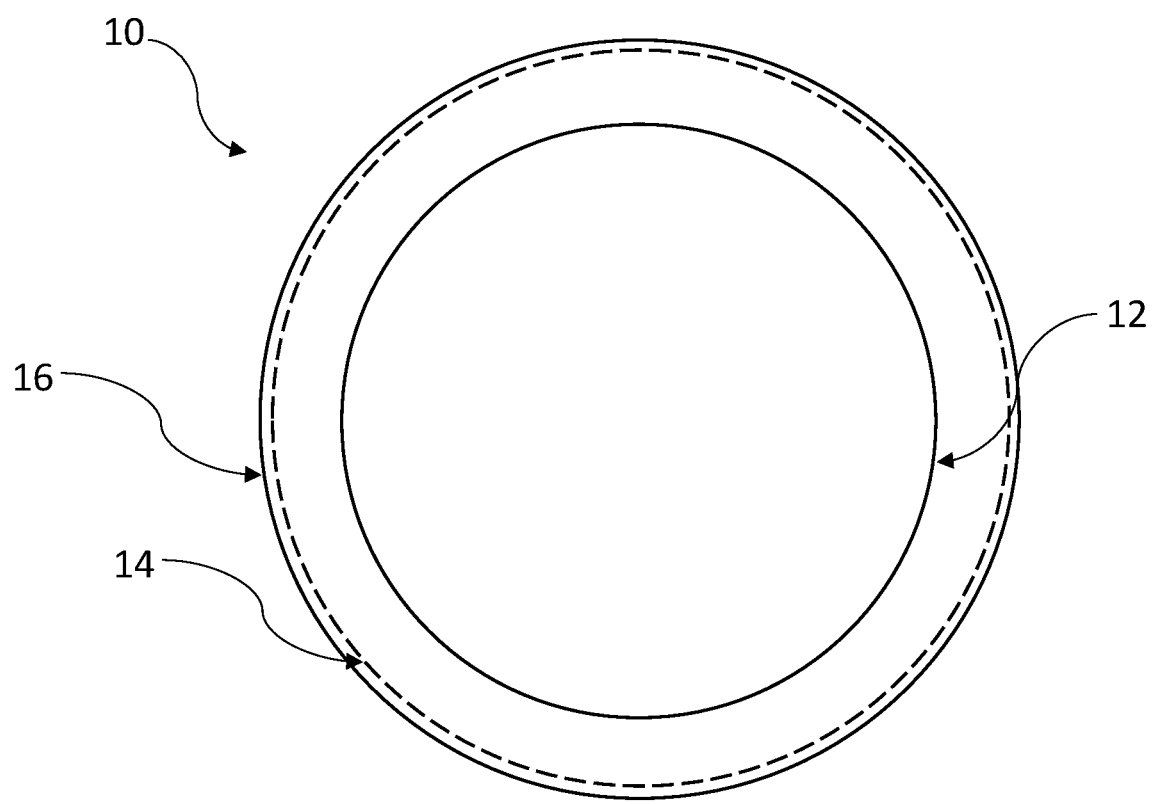
FIG. 1 is a cross-sectional view of a core assemblage in accordance with an embodiment of the present disclosure.

The present disclosure relates to thermoplastic elastomer compositions for use in golf balls. In particular, when the thermoplastic elastomer compositions of the present disclosure are used in golf balls, the golf balls have increased durability over golf balls that include conventional thermoplastic elastomer compositions. More specifically, the thermoplastic elastomer compositions of the present disclosure may be used to form an outer layer of a golf ball to increase shear durability. The composition and the components and golf balls formed therefrom are discussed in more detail below.

Thermoplastic Elastomer Compositions

The thermoplastic composition may include a blend of at least two thermoplastic elastomers (TPE). In one embodiment, the thermoplastic elastomer composition of the present disclosure includes a first TPE and a second TPE. In this aspect, the first TPE may be included in the thermoplastic elastomer composition in an amount of about 80 percent or more by weight based on the total weight of the composition. In one embodiment, the first TPE may be included in the thermoplastic elastomer composition in an amount of about 90 percent or more by weight based on the total weight of the composition. In some aspects, the first TPE may be included in an amount of about 99 percent to about 92.5 percent by weight based on the total weight of the composition. In one embodiment, the first TPE is included in the composition in an amount of about 99 percent to about 95 percent by weight based on the total weight of the composition. In another embodiment, the first TPE is included in the composition in an amount of about 99 percent to about 97 percent by weight based on the total weight of the composition.

The second TPE may be included in the thermoplastic elastomer composition in an amount of about 20 percent or less by weight based on the total weight of the thermoplastic elastomer composition. In one aspect, the second TPE may be included in the thermoplastic elastomer composition in an amount of about 10 percent or less by weight based on the total weight of the thermoplastic elastomer composition. In some embodiments, the second TPE may be included in an amount of about 1 percent to about 7.5 percent by weight based on the total weight of the composition. In one embodiment, the second TPE is included in the composition in an amount of about 1 percent to about 5 percent by weight based on the total weight of the composition. In another embodiment, the second TPE is included in the composition in an amount of about 1 percent to about 3 percent by weight based on the total weight of the composition.

Without being bound by any particular theory, the thermoplastic elastomer composition may allow or promote additional cross-linking in the golf ball layer as compared to layers including only one TPE such as thermoplastic polyurethane. The additional crosslinking improves shear durability of the golf ball layer.

In some embodiments, the first TPE is a thermoplastic polyurethane elastomer (TPU), a thermoplastic polyurea elastomer (TPUR), or thermoplastic elastomer that is a polyurethane-polyurea hybrid. In other words, the first TPE includes organic units joined by at least one of the following linkages:

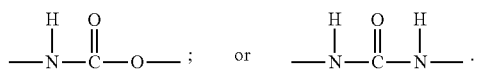

Such TPEs are generally block copolymers composed of a hard segment and soft segments.

Suitable TPUs include those formed from the reaction product of an isocyanate element and a resin blend element. Polyisocyanates for use in forming the first TPE have more than one isocyanate group, e.g., di-, tri-, and tetra-isocyanate, and may be a monomer, polymer, quasi prepolymer, or prepolymer. The prepolymer, or quasi-prepolymer, may be made from an amine-terminated polymer resin, or a hydroxyl-terminated polymer resin, which is then combined with the curing agent. The resin blend element may be a polyol, e.g., a hydroxyl-terminated polymer resin or a hydroxyl-terminated chain extender, or a polyamine, e.g., an amine-terminated polymer resin, an amine-terminated chain extender, or a combination thereof. Thus, when polyols are described may be suitable for use in one or both components of the TPU, i.e., as part of a prepolymer and in the curing agent.

Suitable TPURs are also the reaction product of an isocyanate element and a resin blend element. Like TPUs, the isocyanate may be a monomer, polymer, quasi prepolymer, or prepolymer and the prepolymer, or quasi-prepolymer, may be made from an amine-terminated polymer resin, or a hydroxyl-terminated polymer resin. Unlike TPUs, the resin blend element in TPURs includes only polyamines, e.g., amine-terminated polymer resins, and/or amine-terminated chain extenders, such that the resulting TPUR does not include any intentional hydroxyl moieties.

The present disclosure is not limited by the use of a particular polyisocyanate in the first TPE. Suitable isocyanates for the first and second TPEs may be aromatic or aliphatic in nature. Nonlimiting examples of polyisocyanates for use with the present invention include 4,4'-diphenylmethane diisocyanate ("MDI"), polymeric MDI, carbodiimide-modified liquid MDI, 4,4'-dicyclohexylmethane diisocyanate ("H$_{12}$MDI"), p-phenylene diisocyanate ("PPDI"), toluene diisocyanate ("TDI"), 3,3'-dimethyl-4,4'-biphenylene diisocyanate ("TODI"), isophoronediisocyanate ("IPDI"), hexamethylene diisocyanate ("HDI"), naphthalene diisocyanate ("NDI"); xylene diisocyanate ("XDI"); p-methylxylene diisocyanate; m-methylxylene diisocyanate; o-methylxylene diisocyanate; para-tetramethylxylene diisocyanate ("p-TMXDI"); meta-tetramethylxylene diisocyanate ("m-TMXDI"); ethylene diisocyanate; propylene-1,2-diisocyanate; tetramethylene-1,4-diisocyanate; cyclohexyl diisocyanate; 1,6-hexamethylene-diisocyanate ("HDI"); dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of HDI; triisocyanate of 2,4,4-trimethyl-1,6-hexane diisocyanate ("TMDI"), tetracene diisocyanate, naphthalene diisocyanate, anthracene diisocyanate; and combinations thereof. In one embodiment, the polyisocyanate is selected from MDI, PPDI, TDI, and combinations thereof. In another embodiment, the polyisocyanate includes MDI. It should be understood that, as used herein, the term "MDI" includes 4,4'-diphenylmethane diisocyanate, polymeric MDI, carbodiimide-modified liquid MDI, HuMDI, and combinations thereof.

In some embodiments, isocyanate employed may be "low free monomer," understood by one of ordinary skill in the art to have lower levels of "free" monomer isocyanate groups than conventional diisocyanates, i.e., the compositions of the invention typically have less than about 0.1% free monomer groups. Examples of "low free monomer" diisocyanates include, but are not limited to Low Free Monomer MDI, Low Free Monomer TDI, and Low Free Monomer PPDI.

In some embodiments, the polyisocyanate may have less than about 14% unreacted NCO groups. For example, the polyisocyanate may have no more than about 8.5% NCO. In this aspect, the polyisocyanate may have about 2.5% to about 8.0%, about 4.0% to about 7.2%, or about 5.0% to 6.5% NCO.

Suitable polyols include, but are not limited to, polyether polyols, hydroxy-terminated polybutadienes, polyester polyols, polycaprolactone polyols, polycarbonate polyols, and combinations thereof. In this aspect, the polyol may include any one of ethylene glycol; diethylene glycol; polyethylene glycol; propylene glycol; polypropylene glycol; lower molecular weight polytetramethylene ether glycol; 1,3-bis(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol; 1,5-pentanediol; 1,6-hexanediol; resorcinol-di-(β-hydroxyethyl) ether; hydroquinone-di-(β-hydroxyethyl) ether; trimethylol propane; and combinations thereof.

Suitable polyamines include, but are not limited to, 3,5-dimethylthio-2,4-toluenediamine, or an isomer thereof, 3,5-diethyltoluene-2,4-diamine, or an isomer thereof; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); trimethylene glycol-di-p-aminobenzoate; polytetramethyleneoxide-di-p-aminobenzoate; N,N'-dialkyldiamino diphenyl methane; p,p'-methylene dianiline; phenylenediamine; 4,4'-methylene-bis-(2-chloroaniline); 4,4'-methylene-bis-(2,6-diethylaniline); 4,4'-diamino-3,3'-diethyl-5,5'-dimethyl diphenylmethane; 2,2',3,3'-tetrachloro diamino diphenylmethane; 4,4'-methylene-bis-(3-chloro-2,6-diethylaniline); and combinations thereof.

In some embodiments, the first TPE is polyether-based. For example, the first TPE may be a polyether-based TPU or a polyether-based TPUR. In this regard, in some embodiments, the first TPE may include polyether segments (such as polyalkylene (ether) glycol or polyol). In one aspect, the polyether segments may include long-chain polyols. In a further aspect, the polyether segments include polyethylene glycol (PEG), polypropylene glycol (PPG) or polypropylene ether glycol (PPEG), polytetramethylene glycol (PTMG or PTHF) polytetramethylene ether glycol, and combinations thereof.

In other embodiments, the first TPE is polyester based. For example, the first TPE may be a polyester-based TPU or polyester-based TPUR. In this regard, in some embodiments, the first TPE may include polyester segments produced by the reaction of dicarboxylic derivative (such as terephthalate) and diols (such as butanediol). In this aspect, the polyester segments may include polybutylene terephthalate (PBT).

The first TPE may have a Shore D hardness that ranges from about 20 to about 75. In one embodiment, the first TPE has a hardness of about 30 to about 70 Shore D. In another embodiment, the first TPE has a hardness of about 40 to about 60 Shore D. In still another embodiment, the Shore D hardness of the first TPE is about 45 to about 55.

The second TPE may include, but is not limited to, a copolymer having polyamide blocks and polyether blocks, or a polyether block amide (PEBA). In general, the polyamide is rigid and the polyether is flexible. The second TPE may be derived by any method that attaches the polyamide blocks and the polyether blocks. In one aspect, the PEBA may be obtained from the copolycondensation of polyamide and polyether blocks prepared beforehand. In another aspect, the PEBA is obtained from a simultaneous reaction of the polyether and polyamide-block precursors.

In some embodiments, the copolymer results from the copolycondensation of polyamide blocks containing reactive ends with polyether blocks containing reactive ends, for example:
1) Polyamide blocks containing diamine chain ends with polyoxyalkylene blocks containing carboxylic chain ends;
2) Polyamide blocks containing dicarboxylic chain ends with polyoxyalkylene blocks containing diamine chain ends obtained by cyanoethylation and hydrogenation of aliphatic dihydroxylated alpha-omega polyoxyalkylenes; and
3) Polyamide blocks containing dicarboxylic chain ends with polyether diols.

In one aspect, the second TPE is a block copolymer obtained by polycondensation of a carboxylic acid polyamide with an alcohol termination polyether, having the following general structure (I):

$$HO-(CO-PA-CO-O-PE-O)_n-H \qquad (I)$$

where PA is polyamide and PE is polyether.

In other embodiments, the copolymers include randomly distributed units where the copolymers are prepared by the simultaneous reaction of the polyether and polyamide-block precursors.

Suitable polyamides for use in forming the PEBA include, but are not limited to, PA6, PA11, PA12. Commercially available polyamides for use in forming the second TPE in accordance with the present disclosure include, but are not limited to, RILSAN® (Arkema). Suitable polyethers for use in forming the PEBA include, but are not limited to, polytetramethylene glycol (PTMG) and polyethylene glycol (PEG). The polyether blocks may represent about 5 percent to about 85 percent by weight of the copolymer. In one embodiment, the polyether blocks represent about 10 percent to about 70 percent by weight of the copolymer. In another embodiment, the polyether blocks represent about 20 percent to about 60 percent by weight of the copolymer. For example, in one aspect, the polyether blocks represent about 30 percent to about 55 percent by weight of the copolymer.

The second TPE may have a Shore D hardness that ranges from about 20 to about 75. In one embodiment, the second TPE has a hardness of about 20 to about 50 Shore D. In another embodiment, the second TPE has a hardness of about 40 to about 70 Shore D. In still another embodiment, the Shore D hardness of the second TPE is about 30 to about 70. In yet another embodiment, the second TPE has a hardness of about 45 to about 60 Shore D. The flexural modulus of the second TPE may range from about 1700 psi to about 80,000 psi. In one embodiment, the second TPE has a flexural modulus of about 1700 psi to about 35,000 psi. In another embodiment, the flexural modulus of the second TPE ranges from about 10,000 psi to about 75,000 psi. In still another embodiment, the second TPE has a flexural modulus of about 3000 psi to about 70,000 psi.

Commercially available copolymers for use as the second TPE include, but are not limited to, PEBAX® (Arkema) and VESTAMID® (Evonik Industries). In some aspects, when the second TPE is PEBA, the first TPE may be a polyether based TPU or TPUR.

The second TPE may also be a polyether-ester block copolymer (PEEB). A PEEB suitable for use as the second TPE may be formed by copolymerizing a hard segment and a soft segment. In some embodiments, the hard segment is formed from polybutyleneterephthalate and the soft segment may be formed from polyoxyalkylene glycol ester such as polyoxytetramethylene glycol ester or polyoxytrimethylene glycol ester. In other embodiments, the PEEB includes (i) aromatic dicarboxylic acid unit, (ii) 1,3-propanediol and/or 1,4-butanediol unit and (iii) long chain diol unit mainly including polyoxytrimethylene glycol. Suitable aromatic dicarboxylic acid units include, but are not limited to, terephthalic acid, naphthalene-2,6-dicarboxylic acid, naphthalene-2,7-dicarboxylic acid, diphenyl-4,4'-dicarboxylic acid, isophthalic acid, phthalic acid, diphenoxyethane dicarboxylic acid, 5-sulfoisophthalic acid, and combinations thereof. In some aspects, when the second TPE is PEEB, the first TPE may be a polyester based TPU or TPUR.

Golf Balls

Golf balls formed in accordance with the present disclosure include at least a core and a cover. Without being bound to any particular theory, since the thermoplastic elastomer compositions promote/enable more crosslinking in the golf ball layer, golf balls made using the thermoplastic elastomer compositions of the present disclosure are more durable and resilient than conventional golf balls without any sacrifices of performance or processability. In some embodiments, golf balls formed in accordance with the present disclosure have a cover layer formed from the thermoplastic elastomer compositions of the invention. In other embodiments, the thermoplastic elastomer composition is used to form a layer disposed between the core and the cover.

Figure 2:
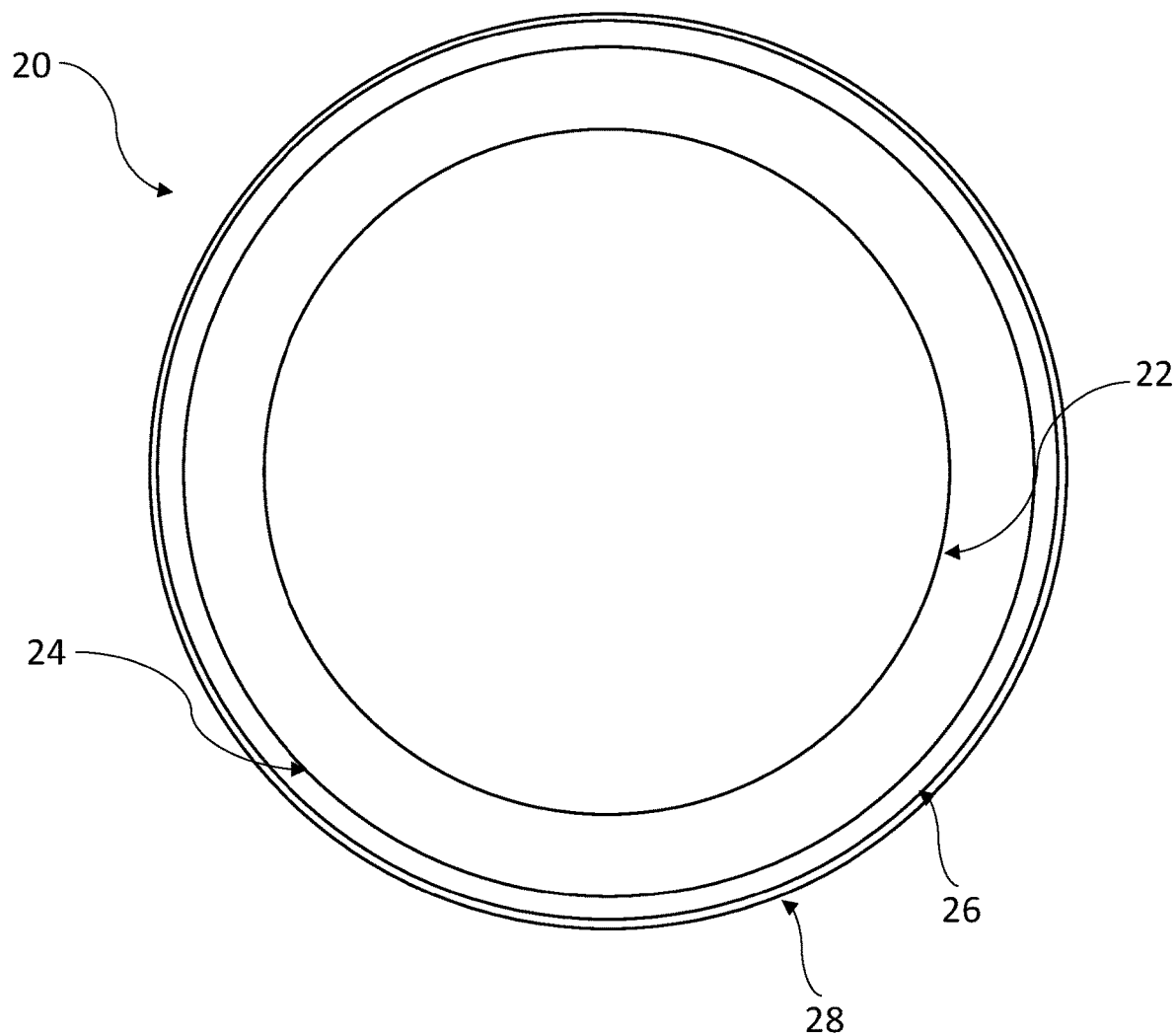
FIG. 2 is a cross-sectional view of a four-piece golf ball in accordance with an embodiment of the present disclosure.
Figure 3:
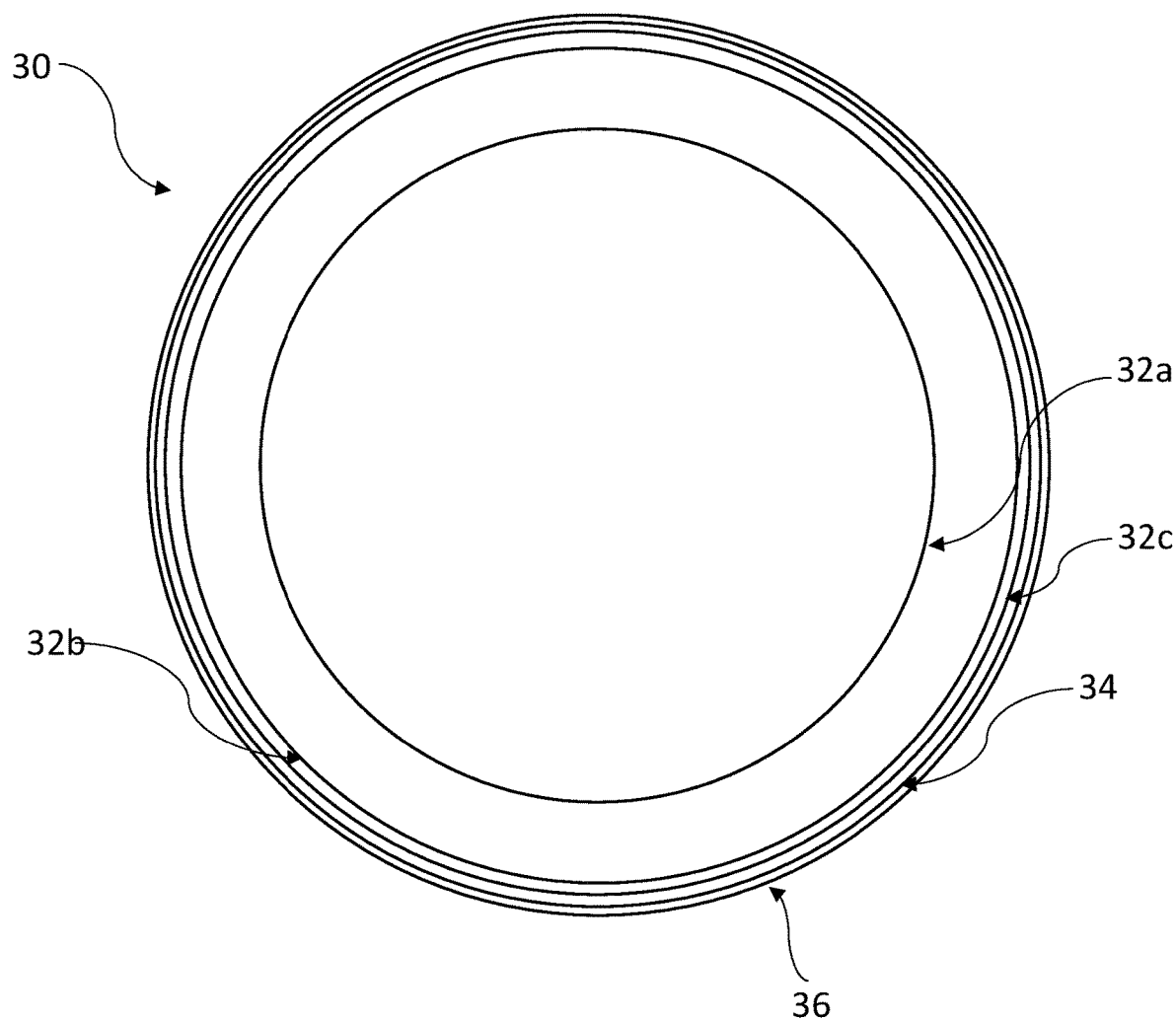
FIG. 3 is a cross-sectional view of a five-piece golf ball in accordance with an embodiment of the present disclosure.

Referring to FIG. 1, in one version, a three-piece golf ball 10 can be made in accordance with this invention. The ball 10 contains a core 12, a cover 16, and an optional layer 14 disposed between the core 12 and the cover 16. Referring to FIG. 2, in one version, a four-piece golf ball 20 can be made in accordance with this invention. The ball 20 contains a center 22, an outer core layer 24, a cover 28, and a layer 26 disposed between the outer core layer and the cover 28. Referring to FIG. 3, in another version, a five-piece golf ball 30 contains a core 32 including a center 32a, an outer core layer 32c, and an inner core layer 32b disposed between the center 32a and the outer core layer 32c, a cover 36, and a layer 34 disposed between the core 32 and the cover 36. In any of these embodiments, the layer 14, 26, and 34 may be considered an intermediate layer, casing or mantle layer, or inner cover layer, or any other layer disposed between the core assemblage and the outer cover of the ball. In any of these embodiments, the cover 16, 28, or 36 may be formed from a thermoplastic elastomer composition of the present disclosure. In the alternative, in any of these embodiments, the layer 14, 26, or 34 may be formed from a thermoplastic elastomer composition of the present disclosure.

Golf balls made in accordance with this invention can be of any size, although the USGA requires that golf balls used in competition have a diameter of at least 1.68 inches. In accordance with the present invention, the weight, diameter, and thickness of the core and cover layers may be adjusted, as needed, so the ball meets USGA specifications of a maximum weight of 1.62 ounces and a minimum diameter of at least 1.68 inches. There is no upper limit so many golf balls have an overall diameter falling within the range of about 1.68 to about 1.80 inches. In this regard, golf balls made in accordance with this invention have a diameter in the range of about 1.68 to about 1.80 inches. In one embodiment, the golf ball diameter is about 1.68 to 1.74 inches. In another embodiment, the golf ball diameter is about 1.68 to 1.70 inches. For play outside of United States Golf Association (USGA) rules, the golf balls can be of a smaller size. In one embodiment, golf balls made in accordance with this invention have a diameter in the range of about 1.68 inches or less, e.g., 1.55 inches to about 1.68 inches.

The core of a golf ball formed in accordance with the present disclosure may include a solid sphere or a center and at least one core layer disposed thereon. Core components may be formed from a rubber formulation. In one embodiment, the rubber formulation includes a base rubber in an amount of about 5 percent to 100 percent by weight based on total weight of formulation. In one embodiment, the base rubber is included in the rubber formulation in an amount within a range having a lower limit of about 5 percent or 10 percent or 20 percent or 30 percent or 40 percent or 50 percent and an upper limit of about 55 percent or 60 percent or 70 percent or 80 percent or 90 percent or 95 percent or 100 percent. For example, the base rubber may be present in the rubber formulation in an amount of about 40 percent to about 95 percent by weight based on the total weight of the formulation. In one embodiment, the rubber formulation includes about 55 percent to about 95 percent base rubber based on the total weight of the formulation.

The base rubber may be polybutadiene, polyisoprene, ethylene propylene rubber, ethylene-propylene-diene rubber, styrene-butadiene rubber, styrenic block copolymer rubbers, polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and blends of two or more thereof. In one embodiment, the rubber formulation includes polybutadiene rubber, butyl rubber, or a blend thereof as the base rubber.

The rubber formulations further include a reactive cross-linking co-agent. Suitable co-agents include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. In one embodiment, the co-agent is one or more metal salts of acrylates, diacrylates, methacrylates, and dimethacrylates, wherein the metal is selected from magnesium, calcium, zinc, aluminum, lithium, and nickel. In another embodiment, the co-agent includes one or more zinc salts of acrylates, diacrylates, methacrylates, and dimethacrylates. For example, the co-agent may be zinc diacrylate (ZDA). In another embodiment, the co-agent may be zinc dimethacrylate (ZDMA).

The co-agent may be included in the rubber formulation in varying amounts depending on the specific core component for which the rubber formulation is intended. In one embodiment, the amount of co-agent used in the rubber formulations increases for each outer component of the core assemblage. In other words, the co-agent in the rubber formulation for the center is included in a first amount and the co-agent in the rubber formulation for the outer core layer is included in a second amount. The second amount may be more than the first amount. In this aspect, the first amount may be about 25 percent to about 90 percent of the second amount. For example, the first amount may be about 40 percent to about 80 percent of the second amount. In one embodiment, the first amount is about 60 percent to about 75 percent of the second amount.

Radical scavengers such as a halogenated organosulfur, organic disulfide, or inorganic disulfide compounds may also be added to the rubber formulation. In one embodiment, a halogenated organosulfur compound included in the rubber formulation includes, but is not limited to, pentachlorothiophenol (PCTP) and salts of PCTP such as zinc pentachlorothiophenol (ZnPCTP). In another embodiment, ditolyl disulfide, diphenyl disulfide, dixylyl disulfide, 2-nitroresorcinol, and combinations thereof are added to the rubber formulation.

The rubber formulation may be cured using conventional curing processes. Non-limiting examples of curing processes suitable for use in accordance with the present invention include peroxide-curing, sulfur-curing, high-energy radiation, and combinations thereof. In one embodiment, the rubber formulation includes a free-radical initiator selected from organic peroxides, high energy radiation sources capable of generating free-radicals, and combinations thereof. Suitable organic peroxides include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BC, commercially available from Akzo Nobel. Peroxide free-radical initiators may be present in the rubber formulation in an amount of at least 0.05 parts by weight per 100 parts of the total rubber, or an amount within the range having a lower limit of 0.05 parts or 0.1 parts or 1 part or 1.25 parts or 1.5 parts or 2.5 parts or 5 parts by weight per 100 parts of the total rubbers, and an upper limit of 2.5 parts or 3 parts or 5 parts or 6 parts or 10 parts or 15 parts by weight per 100 parts of the total rubber. Concentrations are in parts per hundred (phr) unless otherwise indicated. As used herein, the term, "parts per hundred," also known as "phr" or "pph" is defined as the number of parts by weight of a particular component present in a mixture, relative to 100 parts by weight of the polymer component. Mathematically, this can be expressed as the weight of an ingredient divided by the total weight of the polymer, multiplied by a factor of 100.

The core diameter may range from about 1.50 inch to about 1.60 inch. In one embodiment, the core has a diameter of about 1.52 inch to about 1.58 inch. In another embodiment, the core diameter ranges from about 1.54 inch to about 1.56 inch.

When the cover of a golf ball formed in accordance with the present disclosure is not formed of a thermoplastic elastomer composition, such layer(s) may be formed from a variety of materials may be used for forming the cover including, for example, polyurethanes; polyureas; copolymers, blends and hybrids of polyurethane and polyurea; olefin-based copolymer ionomer resins; polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and; cross-linked trans-polyisoprene and blends thereof; polyester-based thermoplastic elastomers; polyurethane-based thermoplastic elastomers; synthetic or natural vulcanized rubber; and combinations thereof.

Likewise, when the layer disposed between the core and the cover (if included) is not formed of a thermoplastic elastomer composition of the present disclosure, conventional and non-conventional materials may be used for forming such layer(s) of the ball including, for instance, ionomer resins, highly neutralized polymers, polybutadiene, butyl rubber, and other rubber-based core formulations, and the like. In this aspect, ionomers suitable for use in accordance with the present disclosure may include partially neutralized ionomers and highly neutralized ionomers (HNPs), including ionomers formed from blends of two or more partially neutralized ionomers, blends of two or more highly neutralized ionomers, and blends of one or more partially neutralized ionomers with one or more highly neutralized ionomers. For purposes of the present disclosure, "HNP" refers to an acid copolymer after at least 70 percent of all acid groups present in the composition are neutralized.

Suitable ionomers may be salts of O/X- and O/X/Y-type acid copolymers, wherein O is an $\alpha$-olefin, X is a $C_3$-$C_8$ $\alpha,\beta$-ethylenically unsaturated carboxylic acid, and Y is a softening monomer. O is preferably selected from ethylene and propylene. X may be selected from methacrylic acid, acrylic acid, ethacrylic acid, crotonic acid, and itaconic acid, Y may be selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate. Nonlimiting examples of O/X and O/X/Y-type copolymers include ethylene acid copolymers, such as ethylene/(meth)acrylic acid, ethylene/(meth)acrylic acid/maleic anhydride, ethylene/(meth)acrylic acid/maleic acid mono-ester, ethylene/maleic acid, ethylene/maleic acid mono-ester, ethylene/(meth)acrylic acid/n-butyl (meth)acrylate, ethylene/(meth)acrylic acid/iso-butyl (meth)acrylate, ethylene/(meth)acrylic acid/methyl (meth)acrylate, ethylene/(meth)acrylic acid/ethyl (meth)acrylate terpolymers, and the like.

"Low acid" and "high acid" ionomeric polymers, as well as blends of such ionomers, may be used. In general, low acid ionomers are considered to be those containing 16 weight percent or less of acid moieties, whereas high acid ionomers (e.g., Surlyn® 8150) are considered to be those containing greater than 16 weight percent of acid moieties. In one embodiment, the inner cover layer is formed from a composition comprising a high acid ionomer. In another embodiment, the inner cover layer is formed from a composition comprising a high acid ionomer and a maleic anhydride-grafted non-ionomeric (e.g., Fusabond© 525D (DuPont)). Blends of high acid ionomers with maleic anhydride-grafted polymers are further disclosed, for example, in U.S. Pat. Nos. 6,992,135 and 6,677,401, the entire disclosures of which are hereby incorporated herein by reference.

Any of the layers of a golf ball formed in accordance with the present disclosure may include a variety of fillers and additives to impart specific properties to the ball. For example, relatively heavy-weight and light-weight metal fillers such as, particulate; powders; flakes; and fibers of copper, steel, brass, tungsten, titanium, aluminum, magnesium, molybdenum, cobalt, nickel, iron, lead, tin, zinc, barium, bismuth, bronze, silver, gold, and platinum, and alloys and combinations thereof may be used to adjust the specific gravity of the ball. Other additives and fillers include, but are not limited to, optical brighteners, coloring agents such as pigments and dyes, fluorescent agents, whitening agents, UV absorbers, light stabilizers, surfactants, processing aids, antioxidants, stabilizers, softening agents, chemical blowing and foaming agents, defoaming agents, fragrance components, plasticizers, wetting agents, impact modifiers, antiozonants, titanium dioxide, clay, mica, talc, glass flakes, milled glass, and mixtures thereof.

The outermost cover layer preferably has a material hardness of 85 Shore C or less. The thickness of the outermost cover layer is preferably within a range having a lower limit of 0.010 or 0.015 or 0.025 inches and an upper limit of 0.035 or 0.040 or 0.055 or 0.080 inches. Methods for measuring hardness of the layers in the golf ball are described in further detail herein. When included, the inner cover layer preferably has a material hardness within a range having a lower limit of 70 or 75 or 80 or 82 Shore C and an upper limit of 85 or 86 or 90 or 92 Shore C. The thickness of the intermediate layer is preferably within a range having a lower limit of 0.010 or 0.015 or 0.020 or 0.030 inches and an upper limit of 0.035 or 0.045 or 0.080 or 0.120 inches.

In one embodiment, the golf balls made in accordance with the present disclosure include a core as described herein, a layer disposed on the core formed from an ionomeric material, and a cover formed from a thermoplastic elastomer composition of the present disclosure, and the cover has a hardness that is less than that of the layer disposed between the core and the cover. For example, the layer disposed between the core and the cover may have a hardness of greater than about 60 Shore D and the cover may have a hardness of less than about 60 Shore D.

In some aspects, when the layer(s) disposed between the core and the cover is intended to be the hardest point in the ball, e.g., about 50 Shore D to about 75 Shore D, the cover material may have a hardness of about 20 Shore D or greater, preferably about 25 Shore D or greater, and more preferably about 30 Shore D or greater, as measured on the slab. In another embodiment, the cover itself has a hardness of about 30 Shore D or greater. In particular, the cover may be from about 30 Shore D to about 70 Shore D. In one embodiment, the cover has a hardness of about 40 Shore D to about 65 Shore D, and in another embodiment, about 40 Shore to about 55 Shore D. In another aspect of the invention, the cover has a hardness less than about 45 Shore D, preferably less than about 40 Shore D, and more preferably about 25 Shore D to about 40 Shore D. In one embodiment, the cover has a hardness from about 30 Shore D to about 40 Shore D.

In an alternative embodiment, the layer disposed between the core and the cover is formed of a thermoplastic elastomeric composition of the present disclosure and the cover is formed of an ionomeric material. In this alternative embodiment, the layer disposed between the core and the cover may have a hardness of less than about 60 Shore D and the cover may have a hardness of greater than about 55 Shore D and the layer disposed between the core and the cover has a hardness that is less than the cover hardness.

When a dual cover is disposed about the core, the layer disposed between the core and the cover may have a thickness of about 0.01 inches to about 0.1 inches, about 0.015 inches to about 0.08 inches, or about 0.02 inches to about 0.05 inches. The cover may have a thickness of about 0.015 inches to about 0.055 inches, about 0.02 inches to about 0.04 inches, or about 0.025 inches to about 0.035 inches.

A golf ball formed in accordance with the present disclosure has a Coefficient of Restitution (CoR) of at least 0.750 and more preferably at least 0.800 (as measured per the test methods below). Such COR allows players to generate greater ball velocity off the tee and achieve greater distance with their drives. At the same time, a golf ball including a cover or an inner cover formed of a thermoplastic elastomer composition of the present disclosure means that a player will have a more comfortable and natural feeling when striking the ball with a club. Furthermore, such golf balls have good shear durability and mechanical strength.

The shear durability of a golf ball of the present disclosure, which is manifest as the ability of a golf ball to maintain its mechanical stability and integrity upon the application of a shear stress to that golf ball, is preferably comparable or greater than a golf ball formed with a conventional thermoplastic polyurethane cover. As shown in Table 1 below, a "shear durability rating" is a qualitative, or relative, scale that incorporates shear mode (i.e., cut/damaged cover, abrasion type damage, and/or paint damage) and severity and weighs them accordingly to make ratings/scores averageable and errors less impactful of overall scores into a scale.

TABLE 1

Shear Durability Rating Scale

| Rating | Cut/Damaged Cover | Abrasion Type Damage | Paint Damage |
|---|---|---|---|
| 1 | Cut or Cracked Cover with casing layer exposed | | |
| 2 | Severe cover damage with multiple groove marks and deep gouges | | |
| 3 | Moderate cover damage with more than one groove mark, missing or severely raised cover material | | |
| 4 | Moderate cover damage with one larger or several smaller groove mark, raised cover material | Severe abrasion damage, quarter sized are of planed off frets with noticeably altered dimples | |
| 5 | Slight cover damage of one or two groove marks with cover that is cut but not raised or one or two very small, raised pieces | Moderate to severe abrasion with multiple groove marks of removed fret areas, slightly noticeable dimple changes | |
| 6 | Very slight cover damage with one small area of cut cover, but not raised. Sand impregnation | Moderate abrasion damage. Frets are planed off in small dime sized area or one larger (3-4 dimples long) groove mark | Severe paint failure with missing paint on a quarter sized area or greater |
| 7 | | Abrasion of a dime sized area with no major alteration of fret areas | More severe paint damage with missing paint on two or more groove marks |
| 8 | | Minor scratches and abrasion of paint and possible cover abrasion | Moderate paint damage. One to two longer (3-4 dimples long) groove marks with interrupted paint or one groove mark with missing paint only |
| 9 | | | Slight paint damage with only one larger or several smaller groove mark of interrupted paint |
| 10 | | | No damage |

In other words, the higher the shear durability rating is, the higher the shear durability of the material. The shear durability rating above can be determined by using a mechanical golf swing machine where one hit is made on each of about 6 to 12 substantially identical golf balls of substantially the same composition with either a sand wedge or a pitching wedge. After a suitable calibration procedure, each experimental golf ball may be tested and assigned a rating based upon visible manifestations of damage after being struck. The shear durability rating for a golf ball with a particular cover represents a numerical average of all the tested substantially identical golf balls. An alternative way to test shear resistance of a golf ball cover involves using player-testing and evaluating the results after the ball is struck multiple times with wedges and/or short irons.

In one embodiment, a golf ball formed in accordance with the present disclosure, i.e., with a cover layer formed of a thermoplastic elastomer composition as disclosed herein, has a shear durability rating of at least 6. In another embodiment, the shear durability of a golf ball formed in accordance with the present disclosure is at least 7. In still another embodiment, a golf ball formed in accordance with the present disclosure, i.e., with a cover layer formed of a thermoplastic elastomer composition as disclosed herein, has a shear durability rating of at least 8.

In some aspects, the shear durability of a golf ball formed in accordance with the present invention, i.e., with a cover formed of a thermoplastic elastomer composition as disclosed herein, is comparable to or better than a golf ball with a 100 percent TPU cover (holding all of the other ball components constant). In one embodiment, the shear durability of a golf ball formed in accordance with the present invention, i.e., with a cover formed of a thermoplastic elastomer composition as disclosed herein, is about 102 percent or more of the shear durability of a golf ball with a 100 percent TPU cover (holding all of the other ball components constant). In another embodiment, the shear durability of a golf ball formed in accordance with the present invention, i.e., with a cover formed of a thermoplastic elastomer composition as disclosed herein, is about 105 percent or more of the shear durability of a golf ball with a 100 percent TPU cover (holding all of the other ball components constant). In still another embodiment, the shear durability of a golf ball formed in accordance with the present invention, i.e., with a cover formed of a thermoplastic elastomer composition as disclosed herein, is about 110 percent or more of the shear durability of a golf ball with a 100 percent TPU cover (holding all of the other ball components constant).

In some embodiments, the shear durability of a golf ball formed in accordance with the present disclosure is related to the amount of first and second TPE present in the thermoplastic elastomer composition are related to the shear durability rating according to the relationship shown in Equation I.

$$0.1 < \frac{STPE_C}{SD_{min} - \frac{1}{FTPE_C}} < 3.5 \qquad (I)$$

where $FTPE_C$ and $STPE_C$ represent the concentration of the first and second TPEs in parts per hundred, respectively, and $SD_{min}$ represents the minimum shear durability rating of the golf ball (on a scale of 1 to 10). In another embodiment, $$0.2 < \frac{STPE_C}{SD_{min} - \frac{1}{FTPE_C}} < 2.0$$

In still another embodiment, $$0.2 < \frac{STPE_C}{SD_{min} - \frac{1}{FTPE_C}} < 0.8$$

The golf balls of the present disclosure may be formed using a variety of application techniques. For example, the golf ball layers may be formed using compression molding, flip molding, injection molding, retractable pin injection molding, reaction injection molding (RIM), liquid injection molding (LIM), casting, vacuum forming, powder coating, flow coating, spin coating, dipping, spraying, and the like. Conventionally, compression molding and injection molding are applied to thermoplastic materials, whereas RIM, liquid injection molding, and casting are employed on thermoset materials. In this aspect, cover layers may be formed over the core assemblage using any suitable technique that is associated with the material used to form the layer. For example, the thermoplastic elastomer compositions of the present disclosure may be formed into one or more layers of a golf ball by conventional compression or injection molding techniques.

Golf balls made in accordance with the present disclosure may be subjected to finishing steps such as flash-trimming, surface-treatment, marking, coating, and the like using techniques known in the art. In one embodiment, a white-pigmented cover may be surface-treated using a suitable method such as, for example, corona, plasma, or ultraviolet (UV) light-treatment. Indicia such as trademarks, symbols, logos, letters, and the like may be printed on the cover using pad-printing, ink-jet printing, dye-sublimation, or other suitable printing methods. Clear surface coatings (for example, primer and top-coats), which may contain a fluorescent whitening agent, may be applied to the cover. Golf balls may also be painted with one or more paint coatings in a variety of colors. In one embodiment, white primer paint is applied first to the surface of the ball and then a white topcoat of paint may be applied over the primer.

EXAMPLES

The following examples illustrate golf balls formed in accordance with the present disclosure.

Examples 1-5

In each example provided in Table 2 below, the golf balls include a rubber core with an ionomer layer disposed thereon. The thin cover is formed from a first TPE only (i.e., 100 percent ether-based TPU Estane® ETE 50DT3 (Control Example 1)), and variations of the thermoplastic elastomer compositions of the present disclosure (i.e., a blend of the first TPE and a second TPE (Examples 2-5)). In particular, varying weight percentages of PEBA as the second TPE with the remainder including ether-based thermoplastic polyurethane as the first TPE were used for Examples 2-5. More specifically, the formulations for Examples 2-5 include varying weight percentages of Pebax® Rnew® 55R53 SP 01 resin with the remainder Estane® ETE 50DT3 as the first TPE. Six identical balls were made for each cover formulation and rated for shear durability in accordance with Table 1 discussed previously. The shear durability value provided in Table 2 below represents the percent of the shear durability rating of the Control based on the average of the six balls for each cover formulation.

TABLE 2

| | Shear Durability | | | | |
|---|---|---|---|---|---|
| | Example | | | | |
| | Ex 1 (Control) | Ex 2 | Ex 3 | Ex 4 | Ex 5 |
| | Cover Formulation | | | | |
| First TPE | 100 | 95 | 90 | 80 | 70 |
| Second TPE | — | 5 | 10 | 20 | 30 |
| | Shear Durability | | | | |
| Value (as a percent of Control rating) | 100% | 102% | 100% | 77% | 62% |

As demonstrated in Table 2, the shear durability rating of golf balls made with covers formed of a thermoplastic elastomer composition with a weight percent of second TPE of 20 percent and 30 percent is lower than the control ball (made with a 100% Estane® (TPU) cover). Indeed, the shear durability rating of Examples 4 and 5 are 77 percent and 62 percent of the shear durability rating of the Control ball (Example 1). However, golf balls formed with covers formed from thermoplastic elastomer compositions including 5 percent and 10 percent by weight of the second TPE (Examples 2 and 3) have better or comparable shear durability ratings than the control ball, i.e., 102 and 100 percent of the shear durability value for the Control ball (Example 1).

Examples 6-9

Working off of the data in Examples 1-5, the inventors then tested cover formulations with less than 10 percent of the second TPE to determine the effect (if any) of lower weight percentages of the second TPE on the shear durability (as compared to the control ball). In particular, in each example provided in Table 3 below, the golf balls include a rubber core with an ionomer layer disposed thereon. The thin cover is formed from a first TPE only (i.e., 100 percent Estane® ETE 50DT3 (Control Example 6)), and variations of the thermoplastic elastomer compositions of the present disclosure (i.e., a blend of the first TPE and a second TPE (Examples 7-9)). In particular, varying weight percentages of PEBA as the second TPE with the remainder including Estane® ETE 50DT3 as the first TPE were used for Examples 7-9. More specifically, the formulations for Examples 7-9 include varying weight percentages of Pebax® Rnew® 55R53 SP 01 resin. Six identical balls were made for each cover formulation and rated for shear durability in accordance with Table 1 discussed previously. The shear durability value provided in Table 3 below represents the percent of the shear durability rating of the Control based on the average of the six balls for each cover formulation.

TABLE 3

Shear Durability Testing

|  | Ex 6 (Control) | Ex 7 | Ex 8 | Ex 9 |
|---|---|---|---|---|
| Cover Formulation | | | | |
| TPU | 100 | 92.5 | 95 | 97.5 |
| PEBA | — | 7.5 | 5 | 2.5 |
| Shear Durability | | | | |
| Value (as a percent of Control rating | 100% | 100% | 102% | 110% |

Figure 4:
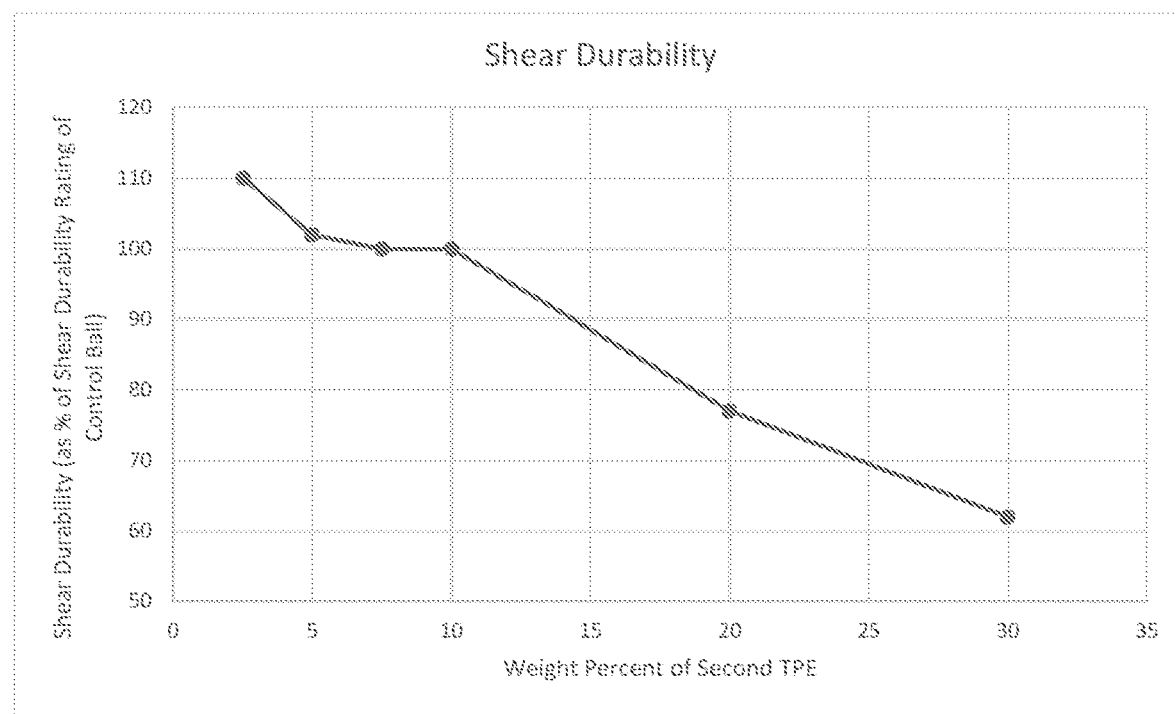
FIG. 4 is a graphical representation of the shear durability of golf balls made in accordance with embodiments of the present disclosure.

Similar to Examples 2-5, as demonstrated in Table 3 and illustrated in FIG. 4, Examples 7-9 show that lesser amounts of the second TPE produce better shear durability values. Indeed, less than half of the amount of the second TPE used in Example 7 provided a shear durability rating 110 percent better than that of the Control (compare Examples 6 and 9 in Table 3). And, like Example 2 in Table 2, using 5 percent by weight of the second TPE produced a shear durability rating 102 percent better than that of the Control (compare Examples 6 and 8 in Table 3). While conventionally small amounts of thermoplastic polyurethane have been known to be added to PEBA-type materials for toughening, it is surprising that the "opposite" blend, i.e., a small amount of PEBA added to TPU, provides improved shear durability.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural forms as well (i.e., at least one of whatever the article modifies), unless the context clearly indicates otherwise.

The terms "first," "second," and the like are used to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the disclosure. Likewise, terms like "top" and "bottom"; "front" and "back"; and "left" and "right" are used to distinguish certain features or elements from each other, but it is expressly contemplated that a top could be a bottom, and vice versa.

The golf balls described and claimed herein are not to be limited in scope by the specific embodiments herein disclosed, since these embodiments are intended as illustrations of several aspects of the disclosure. Any equivalent embodiments are intended to be within the scope of this disclosure. Indeed, various modifications of the device in addition to those shown and described herein will become apparent to those skilled in the art from the foregoing description. Such modifications are also intended to fall within the scope of the appended claims. All patents and patent applications cited in the foregoing text are expressly incorporated herein by reference in their entirety. Any section headings herein are provided only for consistency with the suggestions of 37 C.F.R. § 1.77 or otherwise to provide organizational queues. These headings shall not limit or characterize the invention(s) set forth herein.

What is claimed is:

1. A golf ball, comprising:
   a core; and
   a cover, wherein the cover is formed from a thermoplastic elastomer composition comprising a first thermoplastic elastomer present in an amount of 97 to 99 weight percent by weight and a second thermoplastic elastomer present in an amount of 1 to 3 weight percent based on the total weight of the thermoplastic elastomer composition, and wherein the second thermoplastic elastomer comprises polyether block amide.

2. The golf ball of claim 1, wherein the first thermoplastic elastomer comprises organic units joined by at least one of the following linkages:

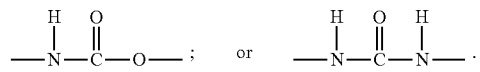

3. The golf ball of claim 2, wherein the first thermoplastic elastomer is thermoplastic polyurethane.

4. The golf ball of claim 3, wherein the thermoplastic polyurethane comprises polyether segments.

5. The golf ball of claim 1, further comprising a layer disposed between the core and the cover.

6. The golf ball of claim 5, wherein the layer comprises an ionomer material.

7. A golf ball, comprising:
   a core;
   a layer disposed on the core; and
   a cover disposed on the layer, wherein the cover is formed from a thermoplastic polyurethane elastomer present in an amount of 97 to 99 weight percent by weight and a second thermoplastic elastomer present in an amount of 1 to 3 weight percent based on the total weight of the thermoplastic elastomer composition, wherein the thermoplastic polyurethane elastomer comprises polyether segments, and wherein the second thermoplastic elastomer comprises polyether and polyamide blocks.

8. The golf ball of claim 7, wherein the second thermoplastic elastomer comprises polyether block amide.

9. The golf ball of claim 7, wherein the layer comprises an ionomer material.

10. A golf ball, comprising:
   a core; and
   a cover, wherein the cover is formed from a thermoplastic elastomer composition comprising a first thermoplastic elastomer present in an amount of 97 to 99 weight percent by weight and a second thermoplastic elastomer present in an amount of 1 to 3 weight percent based on the total weight of the thermoplastic elastomer composition, and wherein the second thermoplastic elastomer comprises polyether-ester block copolymer.

11. The golf ball of claim 10, wherein the first thermoplastic elastomer comprises thermoplastic polyurethane, and wherein the thermoplastic polyurethane comprises polyester segments.

12. The golf ball of claim 10, further comprising a layer disposed between the core and the cover.

13. The golf ball of claim 12, wherein the layer comprises an ionomer material.

14. The golf ball of claim 12, wherein the core comprises a center and an outer core layer disposed on the center, and wherein the center is formed from a first rubber composition and the outer core layer is formed from a second rubber composition.

* * * * *